US012754851B2

(12) United States Patent
Nakra

(10) Patent No.: US 12,754,851 B2
(45) Date of Patent: Oct. 6, 2026

(54) SYSTEMS AND METHODS FOR TAG-BASED CACHE WITH DYNAMIC INDEX SELECTION

(71) Applicant: Samsung Electronics Co., Ltd., Suwon-si (KR)

(72) Inventor: Tarun Nakra, Austin, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/969,943

(22) Filed: Dec. 5, 2024

(65) Prior Publication Data

US 2026/0056887 A1 Feb. 26, 2026

Related U.S. Application Data

(60) Provisional application No. 63/685,104, filed on Aug. 20, 2024.

(51) Int. Cl.
*G06F 3/06* (2006.01)
*G06F 12/02* (2006.01)
*G06F 12/0895* (2016.01)

(52) U.S. Cl.
CPC ...... *G06F 12/0895* (2013.01); *G06F 12/0246* (2013.01)

(58) Field of Classification Search
CPC ............... G06F 12/765; G06F 12/0853; G06F 12/0871; G06F 12/0893; G06F 12/0895; G06F 12/1045; G06F 2212/62; G06F 2212/27; G06F 2212/281; G06F 2212/282; G06F 11/1064
(Continued)

(56) References Cited

U.S. PATENT DOCUMENTS

| | | | | |
|---|---|---|---|---|
| 9,652,384 | B2 | 5/2017 | Trika et al. | |
| 9,912,957 | B1 * | 3/2018 | Surti | G06T 1/20 |

(Continued)

FOREIGN PATENT DOCUMENTS

| | | | |
|---|---|---|---|
| CN | 107341113 | B | 5/2020 |
| CN | 108804042 | B | 6/2021 |

(Continued)

OTHER PUBLICATIONS

Sardashti, Somayeh, et al., "Skewed Compressed Cache," MICRO—47th Annual IEEE/ACM International Symposium on Microarchitecture, 2014, 13 pages, HAL Id: hal-01088050, https://inria.hal.science/hal-01088050.

(Continued)

*Primary Examiner* — Khoa D Doan
(74) *Attorney, Agent, or Firm* — Womble Bond Dickinson (US) LLP

(57) ABSTRACT

A system includes: cache memory; and a cache controller to: store a line of data in the cache memory according to an address of the line and a compression ratio of the line; and return a requested line of data based on a search in a first candidate set of the cache memory having a first index at a first index bit position of an address of the requested line, and in a second candidate set of the cache memory having a second index at a second index bit position of the address of the requested line. The first index bit position is different from the second index bit position.

19 Claims, 10 Drawing Sheets

(58) Field of Classification Search
USPC ............. 711/154, 118, 128, 3, 122, 113, 171
See application file for complete search history.

(56) References Cited

U.S. PATENT DOCUMENTS

| | | | | |
|---|---|---|---|---|
| 10,831,669 | B2 | 11/2020 | Nair et al. | |
| 11,245,415 | B2 | 2/2022 | Ghasemazar et al. | |
| 2010/0169382 | A1* | 7/2010 | Sheaffer | G06F 12/1027 707/E17.014 |
| 2014/0108731 | A1 | 4/2014 | Sardashti et al. | |
| 2016/0041905 | A1* | 2/2016 | Turner | G06F 12/0886 711/3 |
| 2016/0342530 | A1* | 11/2016 | Pellerin, III | G06F 12/0895 |

FOREIGN PATENT DOCUMENTS

| | | | |
|---|---|---|---|
| CN | 111737261 | B | 9/2023 |
| KR | 10-2500904 | B1 | 2/2023 |

OTHER PUBLICATIONS

Sardashti, Somayeh, et al., "Yet Another Compressed Cache: a Low Cost Yet Effective Compressed Cache," ACM Transactions on Architecture and Code Optimization, 2016, 13, 26 pages, HAL Id: hal-01354248, https://inria.hal.science/hal-01354248.

* cited by examiner

SYSTEMS AND METHODS FOR TAG-BASED CACHE WITH DYNAMIC INDEX SELECTION

CROSS-REFERENCE TO RELATED APPLICATION(S)

The present application claims priority to and the benefit of U.S. Provisional Application No. 63/685,104, filed on Aug. 20, 2024, entitled "SUPERBLOCK TAG-BASED CACHE WITH DYNAMIC INDEX SELECTION BASED ON COMPRESSION FACTOR," the entire content of which is incorporated by reference herein.

BACKGROUND

1. Field

Aspects of embodiments of the present disclosure relate to systems and methods for a tag-based cache with dynamic index selection.

2. Description of Related Art

A cache is a memory element that temporarily stores frequently accessed data to speed data access times. Typically, each cache data entry holds a single block of an uncompressed line of data that is accessible through a unique cache tag. However, cache compression allows multiple compressed lines of data to be fit into one block of a single cache data entry. Thus, cache compression increases the effective size of the cache by storing more lines of data within the same cache area as that of a typical uncompressed cache.

The above information disclosed in this Background section is for enhancement of understanding of the background of the present disclosure, and therefore, it may contain information that does not constitute prior art.

SUMMARY

Embodiments of the present disclosure may be directed to systems and methods for a tag based cache, in which an index for a line to be stored may be dynamically selected to reduce conflict misses, and thus, cache thrashing may be reduced.

According to one or more embodiments of the present disclosure, a system includes: cache memory; and a cache controller configured to: store a line of data in the cache memory according to an address of the line and a compression ratio of the line; and return a requested line of data based on a search in a first candidate set of the cache memory having a first index at a first index bit position of an address of the requested line, and in a second candidate set of the cache memory having a second index at a second index bit position of the address of the requested line. The first index bit position is different from the second index bit position.

In an embodiment, the second index bit position may be shifted to one or more significant bits from the first index bit position.

In an embodiment, the first index bit position may be the same as positions of index field bits of the address of the requested line, and the second index bit position may be different from the index field bits of the address of the requested line.

In an embodiment, the compression ratio may indicate a compression amount of the line, or a number of lines that one entry of the cache memory may hold. To store the line of data in the cache memory, the cache controller may be configured to: determine the compression ratio of the line; select a set of the cache memory having an index at one of the first index bit position or the second index bit position of the address of the line based on the compression ratio of the line; and store the line in the set.

In an embodiment, to select the set of the cache memory, the cache controller may be further configured to: determine that the compression ratio of the line has a first value indicating that the line is uncompressed; and select the index at the first index bit position of the address of the line, the first index bit position including one or more less significant bits compared to the second index bit position.

In an embodiment, to select the set of the cache memory, the cache controller may be further configured to: determine that the compression ratio of the line has a second value indicating that the line is compressed; and select the index at the second index bit position of the address of the line, the second index bit position including one or more significant bits compared to the first index bit position.

In an embodiment, to return the requested line of data, the cache controller may be configured to: determine a sequence of bits corresponding to the address of the requested line; identify the first index of the first candidate set based on the first index bit position of the sequence of bits, and a first candidate tag from a first tag bit position of the sequence of bits; identify the second index of the second candidate set based on the second index bit position of the sequence of bits, and a second candidate tag from a second tag bit position of the sequence of bits; search an entry in the first candidate set based on the first candidate tag; and search an entry in the second candidate set based on the second candidate tag. The first tag bit position may be different from the second tag bit position.

In an embodiment, to search the entry in the first candidate set, the cache controller may be further configured to: compare a tag of the entry with the first candidate tag; identify an expected compression ratio based on the first index bit position; and compare a compression ratio value of the entry with the expected compression ratio. In response to a match of each of the compares for the entry in the first candidate set, the controller may be further configured to return the requested line associated with the entry from the first candidate set of the cache memory. In response to a miss resulting from the searches in each of the first candidate set and the second candidate set, the cache controller may be configured to return the requested line of data from another memory, and store the requested line of data in a set of the cache memory according to a compression ratio of the requested line of data.

In an embodiment, to search the entry in the second candidate set, the cache controller may be further configured to: compare a tag of the entry with the second candidate tag; identify an expected compression ratio based on the second index bit position; compare a compression ratio value of the entry with the expected compression ratio; determine a state of one or more valid bits of the entry; and compare the state with a valid state. In response to a match of each of the compares for the entry in the second candidate set, the controller may be further configured to return the requested line associated with the entry from the second candidate set of the cache memory. In response to a miss of the searches in each of the first candidate set and the second candidate set, the cache controller may be configured to return the requested line of data from another memory, and store the requested line of data in a set of the cache memory according to a compression ratio of the requested line of data.

According to one or more embodiments of the present disclosure, a method for storing a line of data in a cache, includes: determining, by a cache controller, a compression ratio of the line; selecting, by the cache controller, a set of a cache memory according to the compression ratio of the line, the set having an index at one of a first index bit position of an address of the line or a second index bit position of the address of the line; and storing, by the cache controller, the line in the set of the cache memory. The first index bit position is different from the second index bit position.

In an embodiment, the second index bit position may be shifted to one or more significant bits from the first index bit position.

In an embodiment, the first index bit position may be the same as positions of index field bits of the address of the line, and the second index bit position may be different from the index field bits of the address of the line.

In an embodiment, the compression ratio may indicate a compression amount of the line, or a number of lines that one entry of the cache memory may hold. The selecting of the set may include: determining, by the cache controller, that the compression ratio of the line has a first value indicating that the line is uncompressed; and selecting, by the cache controller, the index at the first index bit position of the address of the line, the first index bit position including one or more less significant bits compared to the second index bit position.

In an embodiment, the compression ratio may indicate a compression amount of the line, or a number of lines that one entry of the cache memory may hold. The selecting of the set may include: determining, by the cache controller, that the compression ratio of the line has a second value indicating that the line is compressed; and selecting, by the cache controller, the index at the second index bit position of the address of the line, the second index bit position including one or more significant bits compared to the first index bit position.

According to one or more embodiments of the present disclosure, a method for retrieving a line of data, includes: receiving, by a cache controller, an address for a lookup; identifying, by the cache controller, a first candidate set of a cache memory having a first index at a first index bit position of the address; identifying, by the cache controller, a second candidate set of the cache memory having a second index at a second index bit position of the address different from the first index bit position; searching, by the cache controller, in the first candidate set for the line; searching, by the cache controller, in the second candidate set for the line; and returning, by the cache controller, the line based on the searching.

In an embodiment, the second index bit position may be shifted to one or more significant bits from the first index bit position.

In an embodiment, the first index bit position may be the same as positions of index field bits of the address for the lookup, and the second index bit position may be different from the index field bits of the address.

In an embodiment, the method may further include: identifying, by the cache controller, a first candidate tag at a first tag bit position of the address based on the first index bit position of the address; identifying, by the cache controller, a second candidate tag at a second tag bit position of the address based on the second index bit position of the address; searching, by the cache controller, an entry in the first candidate set based on the first candidate tag; and searching, by the cache controller, an entry in the second candidate set based on the second candidate tag. The first tag bit position may be different from the second tag bit position.

In an embodiment, the searching of the entry in the first candidate set may include: comparing, by the cache controller, a tag of the entry with the first candidate tag; identifying, by the cache controller, an expected compression ratio based on the first index bit position; and comparing, by the cache controller a compression ratio value of the entry with the expected compression ratio. In response to a match of each of the comparing for the entry in the first candidate set, the line associated with the entry from the first candidate set of the cache memory may be returned. In response to a miss resulting from the searching in each of the first candidate set and the second candidate set, the line may be retrieved, by the cache controller, from another memory, and stored, by the cache controller, in a set of the cache memory according to a compression ratio of the line of data.

In an embodiment, the searching of the entry in the second candidate set may include: comparing, by the cache controller, a tag of the entry with the second candidate tag; identifying, by the cache controller, an expected compression ratio based on the second index bit position; comparing, by the cache controller, a compression ratio value of the entry with the expected compression ratio; determining, by the cache controller, a state of one or more valid bits of the entry; and comparing, by the cache controller, the state with a valid state. In response to a match of each of the comparing for the entry in the second candidate set, the line associated with the entry from the second candidate set of the cache memory may be returned. In response to a miss resulting from the searching in each of the first candidate set and the second candidate set, the line may be retrieved, by the cache controller, from another memory, and stored, by the cache controller, in a set of the cache memory according to a compression ratio of the line of data.

However, the present disclosure is not limited to the above aspects and features, and the above and additional aspects and features will be set forth, in part, in the detailed description that follows with reference to the drawings, and in part, may be apparent therefrom, or may be learned by practicing one or more of the presented embodiments of the present disclosure.

BRIEF DESCRIPTION OF THE DRAWINGS

The above and other aspects and features of the present disclosure will be more clearly understood from the following detailed description of the illustrative, non-limiting embodiments with reference to the accompanying drawings, in which.

DETAILED DESCRIPTION

Figure 1:
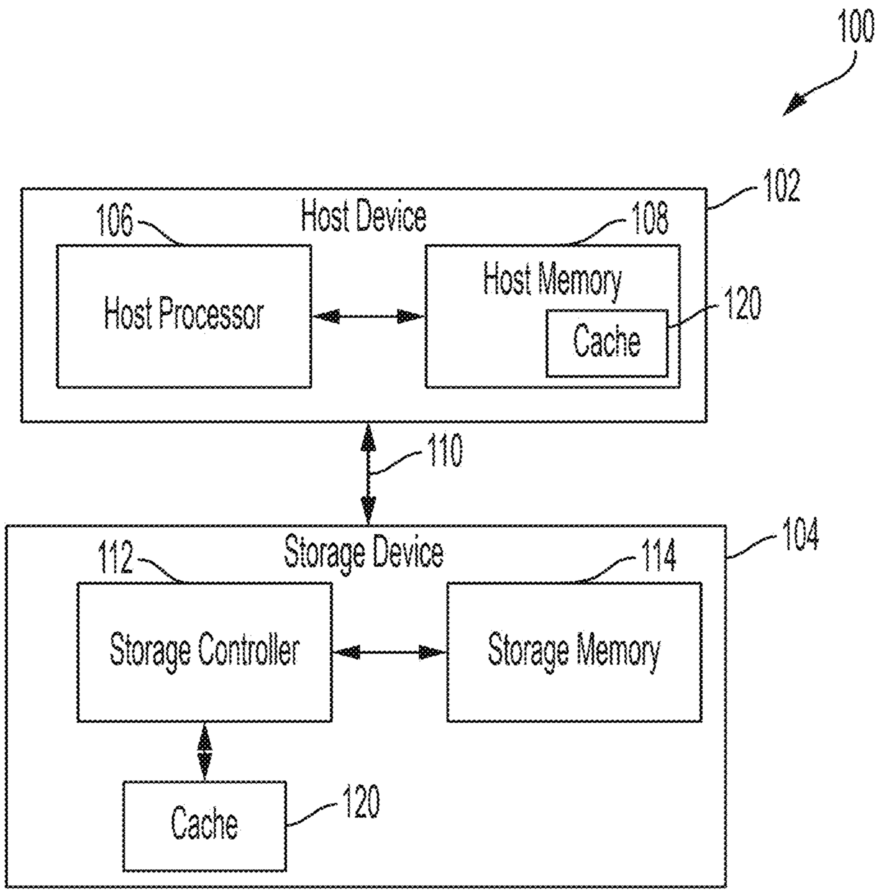
FIG. 1 illustrates a computational system according to one or more embodiments of the present disclosure.

Hereinafter, embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, redundant description thereof may not be repeated. Furter, in the drawings, the relative sizes, thicknesses, and ratios of elements, layers, and regions may be exaggerated and/or simplified for clarity.

When a certain embodiment may be implemented differently, a specific process order may be different from the described order. For example, two consecutively described processes may be performed at the same or substantially at the same time, or may be performed in an order opposite to the described order.

Further, as would be understood by a person having ordinary skill in the art, in view of the present disclosure in its entirety, each suitable feature of the various embodiments of the present disclosure may be combined or combined with each other, partially or entirely, and may be technically interlocked and operated in various suitable ways, and each embodiment may be implemented independently of each other or in conjunction with each other in any suitable manner, unless otherwise stated or implied.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "on," "connected to," or "coupled to" another element or layer, it can be directly on, connected to, or coupled to the other element or layer, or one or more intervening elements or layers may be present. Similarly, when a layer, an area, or an element is referred to as being "electrically connected" to another layer, area, or element, it may be directly electrically connected to the other layer, area, or element, and/or may be indirectly electrically connected with one or more intervening layers, areas, or elements therebetween. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, the expression "A and/or B" denotes A, B, or A and B. Expressions such as "at least one of," when preceding a list of elements, modify the entire list of elements and do not modify the individual elements of the list. For example, the expression "at least one of a, b, or c," "at least one of a, b, and c," and "at least one selected from the group consisting of a, b, and c" indicates only a, only b, only c, both a and b, both a and c, both b and c, all of a, b, and c, or variations thereof.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively.

The electronic or electric devices and/or any other relevant devices or components according to embodiments of the present disclosure described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the example embodiments of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Cache compression allows multiple compressed lines of data to be fit into one block of a single cache data entry. However, in many cases, the lines of data may be uncompressible. In this case, some compression schemes may store contiguous blocks of uncompressed lines in the same cache set (e.g., using a static index mapping) as those of compressed lines, which may lead to thrashing (e.g., frequent cache misses and evictions).

For example YACC (Yet Another Compressed Cache) uses superblocks to store variable sized compressed (or uncompressed) lines sharing a common tag. YACC uses two lower bits as valid bits (e.g., BlkID), and thus, the index bits are set (e.g., are selected) to use more higher-order (e.g., more significant) bits than those for a typical uncompressed cache. Higher-order bits tend to be zero more often, and thus, may cause more set index conflicts, thereby reducing cache utilization. This issue may be exacerbated if the lines cannot be compressed at all. As such, when workloads exhibit a lot of spatial locality but are uncompressible, YACC allocates contiguous lines into the same set, which can result in cache thrashing due to conflict misses.

On the other hand, SCC (Skewed Compressed Caches) partitions the cache into static way groups, where each way group can only hold lines of the same compression factor CF. Each way group uses a different set hash function to spread the lines across different sets within a way group. However, static partitions of the cache into way groups may limit the effective associativity, because lines with the same compression factor CF can only be allocated into a subset of total ways.

As used herein, a block refers to a physical amount of data (e.g., 64 B) that can be stored in a single cache data entry (e.g., a single cache way), whereas a line refers to the data to be stored. For example, one block may hold one uncompressed line of data, two compressed lines of data, four compressed lines of data, eight compressed lines of data, and the like, depending on an amount of compression (e.g., the compression factor CF or a compression ratio) of the line of data, but the present disclosure is not limited thereto.

According to one or more embodiments of the present disclosure, a cache index may be dynamically selected based on the line's compression ratio (e.g., the compression factor CF). The index bits may be selected (e.g., the index bits may be set) to avoid neighboring lines to map to the same cache set, unless they are compressible into the same superblock. For lines that are not compressible, lower-order (e.g., less significant) index bits may be selected for the index of a cache set, because that may allow contiguous lines to map to different cache sets, thereby reducing conflicts. On the other hand, lines that are highly compressible may user higher-order index bits so that the neighboring lines can be packed into the same superblock address or tag. As such, the dynamic set selection may allow for lines to be packed more efficiently either in a superblock, if compressible, or otherwise, spread across different cache sets to reduce conflict misses.

FIG. 1 illustrates a computational system according to one or more embodiments of the present disclosure.

Referring to FIG. 1, the computational system 100 according to one or more embodiments may include a host device (e.g., a host computer) 102 and a storage device 104. The host device 102 may be communicably connected to the storage device 104, and may transfer data to the storage device 104 to persistently store data in the storage device 104. The host device 102 may include a host processor 106 and a host memory 108. The host processor 106 may be a general purpose processor, for example, such as a CPU core of the host device 102. The host memory 108 may be considered as high performing main memory (e.g., primary memory) of the host device 102. For example, in some embodiments, the host memory 108 may include (or may be) volatile memory, for example, such as dynamic random-access memory (DRAM). However, the present disclosure is not limited thereto, and the host memory 108 may include (or may be) any suitable high performing main memory (e.g., primary memory) replacement for the host device 102 as would be known to those skilled in the art. For example, in other embodiments, the host memory 108 may be relatively high performing non-volatile memory, such as Z-NAND™ (available from Samsung), 3D X-POINT™ (available from Intel and Micron Technology), Phase Change Memory, Resistive RAM, Spin-transfer Torque RAM (STTRAM), and/or the like.

The storage device 104 may be considered as secondary memory that may persistently store data accessible by the host device 102. In this context, the storage device 104 may include (or may be) relatively slower memory when compared to the high performing memory of the host memory 108. For example, in some embodiments, the storage device 104 may be secondary memory of the host device 102, for example, such as an SSD. However, the present disclosure is not limited thereto, and in other embodiments, the storage device 104 may include (or may be) any suitable storage device, for example, such as an HDD, a USB flash drive, a Blue-ray disc drive, and/or the like. In some embodiments, the storage device 104 may conform to a large form factor standard (e.g., a 3.5 inch hard drive form-factor), a small form factor standard (e.g., a 2.5 inch hard drive form-factor), an M·2 form factor, and/or the like. In other embodiments, the storage device 104 may conform to any suitable or desired derivative of these form factors.

In some embodiments, the storage device 104 may include a storage interface 110, a storage controller 112, and storage memory 114. The storage interface 110 may facilitate communications (e.g., using a connector and a protocol) between the host device 102 and the storage device 104. For example, in some embodiments, the storage interface 110 may expose to the host device 102, data communications with the storage controller 112. In some embodiments, the storage interface 110 may facilitate the exchange of storage requests and responses between the host device 102 and the storage device 104. In some embodiments, the storage interface 110 may facilitate data transfers by the storage device 104 to and from the host memory 108 of the host device 102. For example, in some embodiments, the storage interface 110 (e.g., the connector and the protocol thereof) may include (or may conform to) Peripheral Component Interconnect Express (PCIe), remote direct memory access (RDMA) over Ethernet, Serial Advanced Technology Attachment (SATA), Fiber Channel, Serial Attached SCSI (SAS), Non Volatile Memory Express (NVMe), and/or the like. In other embodiments, the storage interface 110 (e.g., the connector and the protocol thereof) may include (or may conform to) various general-purpose interfaces, for example, such as Ethernet, Universal Serial Bus (USB), and/or the like.

The storage controller 112 is connected to the storage interface 110, and responds to input/output (I/O) requests received from the host device 102 through the storage interface 110. The storage controller 112 may provide an interface to control, and to provide access to and from, the storage memory 114. For example, the storage controller 112 may include at least one processing circuit embedded thereon for interfacing with the host device 102 and the storage memory 114. The processing circuit may include, for example, a digital circuit (e.g., a microcontroller, a microprocessor, a digital signal processor, a field programmable gate array (FPGA), an application-specific integrated circuit (ASIC), and/or the like) capable of executing data access instructions to provide access to and from the data stored in the storage memory 114 according to the data access instructions. For example, the data access instructions may include any suitable data storage and retrieval algorithm (e.g., read/write) instructions, encryption/decryption algorithm instructions, compression algorithm instructions, and/or the like. The storage memory 114 may persistently store the data received from the host device 102. The storage memory 114 may include non-volatile memory, for example, such as NAND flash memory. However, the present disclosure is not limited thereto, and the storage memory 114 may include any suitable memory depending on an implementation of the storage device 104, for example, such as some of the examples provided above for the host memory 108.

As shown in FIG. 1, in some embodiments, at least one of the host device 102 or the storage device 104 may further include a cache 120. The cache 120 may temporarily store frequently accessed data by at least one of the host processor 106 or the storage controller 112 to speed data access times. For example, the cache 120 may be an L1 cache, an L2 cache, an L3 cache, a disk cache, a persistant cache, a flash cache, or the like. The cache 120 may store lines of data in a compressed format, an uncompressed format, or both a compressed format and an uncompressed format.

Figure 2:
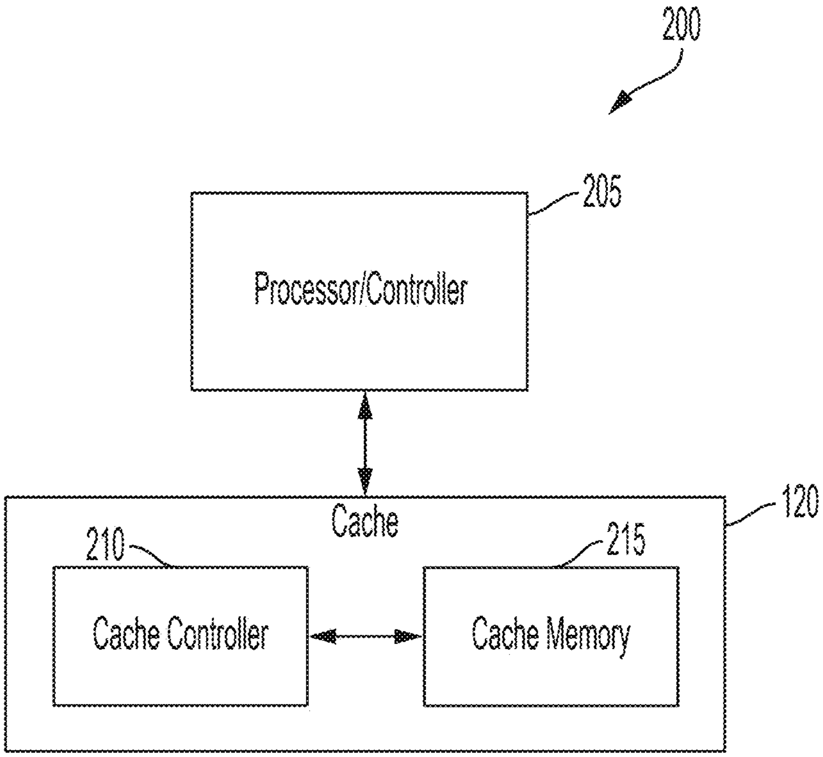
FIG. 2 is a block diagram illustrating a cache system according to one or more embodiments of the present disclosure.

FIG. 2 is a block diagram illustrating a cache system according to one or more embodiments of the present disclosure.

Referring to FIG. 2, the cache system 200 may include a processor/controller 205 (which may also be referred to as a processor, a controller, a processing circuit, a control circuit, and/or the like) and the cache 120. The processor/controller 205 may be any one of the host processor 106 or the storage controller 112 described above with reference to FIG. 1. The cache 120 may include a cache controller 210 and cache memory 215. The cache controller 210 may may provide an interface to control, and to provide access to and from, the cache memory 215. For example, the cache controller 210 may include at least one processing circuit embedded thereon for interfacing with the processor/controller 205 and the cache memory 215. The processing circuit may include, for example, a digital circuit (e.g., a microcontroller, a microprocessor, a digital signal processor, a field programmable gate array (FPGA), an application-specific integrated circuit (ASIC), and/or the like) capable of executing data access instructions (e.g., a cache fill, a tag lookup, and the like) to provide access to and from the data stored in the cache memory 215 according to the data access instructions. While FIG. 2 shows the cache controller 210 as being separate from the processor/controller 205, the present disclosure is not limited thereto, and in some embodiments, the cache controller 210 may be part of the processor/controller 205.

The cache memory 215 may temporarily store the data requested by the processor/controller 205. For example, the cache memory 215 may include (or may be) volatile memory, for example, such as SRAM, DRAM, or the like. However, the present disclosure is not limited thereto, and in other embodiments, the cache memory 215 may include any suitable memory depending on its implementation, for example, such as some of the examples provided above for the host memory 108 and/or the storage memory 114. As an example, FIG. 1 illustrates that the cache 120 (e.g., the cache memory 215) is a partition (e.g., logical and/or physical) of the host memory 108 and/or is a separate memory from the storage memory 114, but the present disclosure is not limited thereto. For example, the cache memory 215 may be a partition (e.g., logical and/or physical) of the host memory 108, a partition of the storage memory 114, or a separate memory device or chip that is controlled by the cache controller 210.

In some embodiments, the cache controller 210 may receive an instruction (e.g., a read instruction or a write instruction) associated with an address, resulting in a fill (e.g., a cache fill) of the cache memory 215 with one or more lines of data. For example, in some embodiments, the cache controller 210 may receive a first instruction (e.g., a write instruction) from the processor/controller 205, and may cache one or more lines of data corresponding to an address associated with the first instruction in the cache memory 215. As another example, the cache controller 210 may receive a second instruction (e.g., a read instruction) from the processor/controller 205, and in response to a cache miss discussed in more detail below, may cache one or more lines of data corresponding to an address associated with the second instruction in the cache memory 215. The lines of data may each be in a compressed format or an uncompressed format. For example, in some embodiments, during the cache fill, the cache controller 205 may identify a compression ratio or a compression factor CF for the line of data to be stored in the cache memory 215, which may correspond to an indicator of an amount of compression of the line of data to be stored (e.g., how compressible the line of data to be stored is). In some embodiments, based on the compression factor CF of the line of data to be stored, the cache controller 205 may dynamically select an index for a cache set, and may store the corresponding line of data (which may be compressed or uncompressed) according to set bit positions of the selected index. For example, the index may be selected from among various cache indicies identified by different combinations of bit positions associated with the address for different compression factors CF, and used to set the index bits of the cache set in which the line is stored. This will be described in more detail below.

In some embodiments, the cache controller 205 may receive the second instruction (e.g., the read instruction) from the processor/controller 205, resulting in a lookup (e.g, a tag lookup) of the address associated with the second instruction from the cache memory 215. In this case, however, the compression factor CF may not be known at the time of the lookup, and thus, the cache controller 205 may not know which of the bits in the address correspond to the set index bits (e.g., the index bits that were selected) when the cache memory 215 was filled. In some embodiments, all the possible sets (e.g., all the possible indicies) that may have been selected for a line during a cache fill may be checked to determine a cache hit, in response to which the associated line is returned, or to determine the cache miss, in response to which the cache memory 215 is filled. This will be described in more detail below.

Figure 3A:
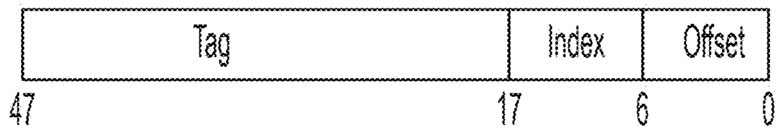
FIG. 3A illustrates a block diagram of some bits of an address according to one or more embodiments of the present disclosure.
Figure 3B:
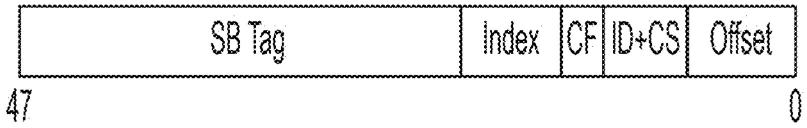
FIG. 3B illustrates a block diagram of some bits of a superblock address according to one or more embodiments of the present disclosure.
Figure 3C:
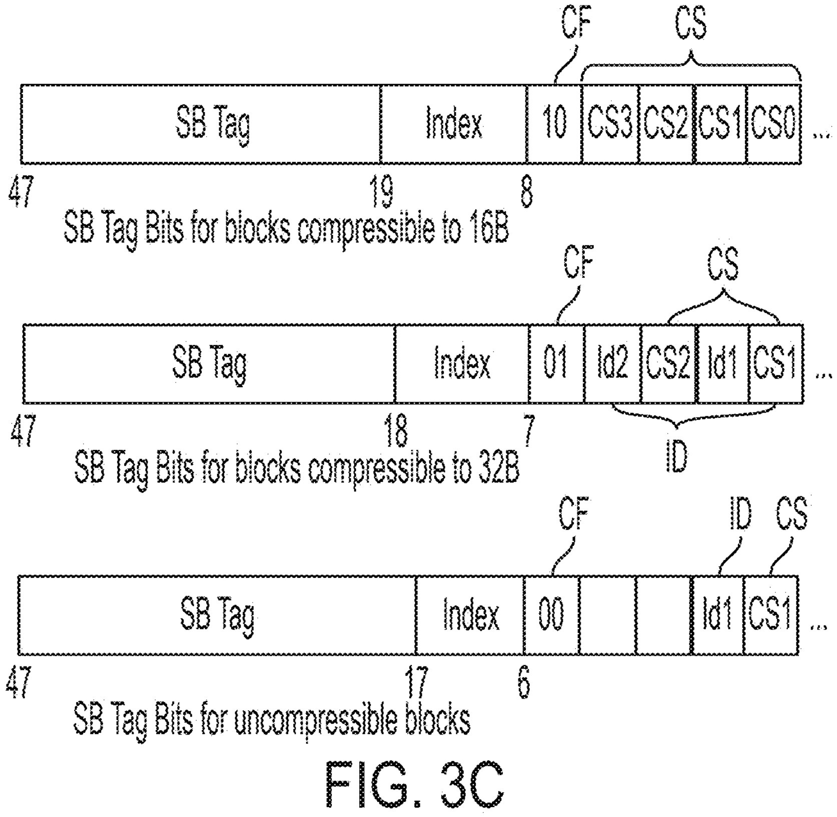
FIG. 3C illustrates a block diagram of some examples of a superblock address for some different compression factors according to one or more embodiments of the present disclosure.

FIG. 3A illustrates a block diagram of some bits of an address according to one or more embodiments of the present disclosure. FIG. 3B illustrates a block diagram of some bits of a superblock address according to one or more embodiments of the present disclosure. FIG. 3C illustrates a block diagram of some examples of a superblock address for some different compression factors according to one or more embodiments of the present disclosure.

Referring to FIG. 3A some bits for an address for an uncompressed 64 B line is shown as a representative example. For example, for an uncompressed 64 B line, the address may include 48-bits (e.g., bits 0 to 47). Bits 47 to 17 may typically correspond to a tag field, bits 16 to 6 may typically correspond to an index field, and bits 5 to 0 may typically correspond to an offset field.

Referring to FIG. 3B and FIG. 3C, because a superblock may hold a plurality of compressed lines in one 64 B block (e.g., in one 64 B superblock), the 48-bits for a superblock address may include additional information in order to track the offsets and the like for each of the one or more compressed lines that may be stored in one 64 B block. For example, some additional information may include one or more bits for the compression factor (CF), one or more bits for block offsets (ID) with 3-bit coherency state (CS) per block offset, one or more optional valid field bits per block offset (e.g., see FIG. 4), and the like. However, additional bits (e.g., such as the valid and block offset fields to track the potential multiple compressed lines that may be stored in the one 64 B block) may be used in the superblock address to track some of the additional information, so that the bits for the index field may be shifted up (e.g., to more significant bits). The shifting allows lines in contiguous address space to be stored within the same cache block.

In this case, as discussed above, YACC uses a static set index, such that no matter the compression factor CF of the line, the index field bit positions are shifted up by the same number of bits. For example, assuming a 2-bit shift of the bit positions of the index field bits to include a 2-bit valid field (which can indicate the valid state of up to 4 16 B compressed lines in a superblock address for one 64 B block), lines having compression factors CF of anywhere from 0 to 2 will have the same bit positions (e.g., Physical Address (PA)), such as PA[18:8], for the index field bits. This can lead to lines in contiguous address space to thrash the same set, especially if the lines are uncompressible.

According to some embodiments of the present disclosure, however, the positions of the index field bits may be set (e.g., may be selected) differently for different compression factors CF of the lines. As a representative example, assuming that a cache entry can hold one 64 B block, a compression factor CF of 0 may indicate that the line is uncompressible. A compression factor CF of 1 may indicate that the line can be compressed into a 32 B chunk, and two 32 B chunks can fit within one 64 B block of the cache entry. A compression factor CF of 2 may indicate that the line can be compressed into a 16 B chunk, and four 16 B chunks may fit within one 64 B block of the cache entry. A compression factor CF of 3 (not shown) may indicate that the line can be compressed into an 8 B chunk, and eight 8 B chunks may fit within one 64 B block of the cache entry, and so on.

In this case, according to some embodiments, as shown in FIG. 3C, as the compression factor CF increases, the index field bit positions may be shifted up (e.g., to more significant bits). For example, for each unit increase in a compression factor CF, the index field bit positions may be shifted up by 1 bit. Returning to the 64 B block example, when the line has a compression factor of 0 (e.g., 00), indicating that the line is uncompressible, the index field bit positions may be selected to be the same as that of the address of the uncompressed line (e.g., PA[16:6]) described above with reference to FIG. 3A. In this case, one or more bits for the compression factor CF (e.g., 00) may be tracked using some of the offset field bits, reserve bits, or the like, and because there can be only 1 uncompressed line in the 64 B block of the cache entry for the compression factor CF of 0, there may be no need for any valid field bits. Accordingly, the tag field bits for a line having the compression factor CF of 0 may also be located in the same bit positions (e.g., PA[47:17]) as those of the address tag field of the uncompressed line in FIG. 3A, and as a result, the uncompressed lines may be indexed similarly to that of a typical uncompressed cache. As such, thrashing may be prevented, minimized, or reduced.

As another example, when the line has a compression factor of 1 (e.g., 01), indicating that the line can be compressed into a 32 B chunk and two 32 B chunks can fit one 64 B block, the index field bit positions may be shifted up by one bit (e.g., PA[17:7]) compared to those of the uncompressed line, and a 1-bit valid field bit (e.g., PA[6]), which is not shown, may be included in the superblock address as the bit below the index field bit positions. The 1-bit valid field is used to track the valid state of up to the two compressed 32 B lines with PA[6]=0 and PA[6]=1, respectively. Hence, each of the 2 compressed lines has a separate valid bit stored. Accordingly, the tag field bits may be reduced by 1-bit (e.g., PA[47:18]) as well when compared to those of the address tag field of the uncompressed line in FIG. 3A. As another example, when the line has a compression factor of 2 (e.g., 10), indicating that the line can be compressed into a 16 B chunk and four 16 B chunks can fit one 64 B block, the index field bit positions may be shifted up by two bits (e.g., PA[18:8]) compared to those of the uncompressed line in FIG. 3A, and a 2-bit valid field bit (e.g., PA[7:6]), which is not shown, may be included as the bits below the index field bit positions. The 2-bit valid field is used to track the valid state of up to the four contiguous compressed 16 B lines with PA[7:6]=[00,01,10,11] respectively. Hence, each of the 4 compressed lines has a separate valid bit stored. Accordingly, the tag field bits may be reduced by 2-bits (e.g., PA[47:19]) as well when compared to those of the address tag field of the uncompressed line in FIG. 3A. As another example (not shown), when the line has a compression factor of 3, indicating that the line can be compressed into an 8 B chunk and eight 8 B chunks can fit one 64 B block, the index field bit positions may be shifted up by three bits (e.g., PA[19:9]) compared to that of the uncompressed line, and a 3-bit valid field bit (e.g., PA[8:6]) may be included as the bits below the index field bit positions. The 3-bit valid field is used to track the valid state of up to the eight compressed 8 B lines with unique PA[8:6] bit values. Hence, each of the 8 compressed lines has a separate valid bit stored. Accordingly, the tag field bits may be reduced by 3-bits (e.g., PA[47:20]) as well when compared to those of the address tag field of the uncompressed line. In FIG. 3C, not all of the bits are shown, such as the valid field bits, and is provided for convenience of illustration of the bit position shifting for the index field bits and the tag field bits depending on the compression factor CF of the line to be stored. Further, while FIG. 3C illustrates an example in which the bits are shifted by 1-bit per compression factor CF increase, the present disclosure is not limited thereto, and the bits may be shifted by any suitable incremental increase per compression factor CF increase, such as a 2-bit increase per compression factor CF increase, or the like. In other words, each time the index bits are shifted left, one more PA bit is added to the valid field bits, but the total lines increase exponentially. So "n valid field bits" from the address may be used to store a unique valid bit for each of $2^n$ lines.

According to some embodiments, upon a cache fill of a line, the cache controller 210 may receive or otherwise identify the compression factor CF of the line to be stored, such that the cache controller 210 may select an appropriate index according to the compression factor CF of the line to be stored, and may store the line in a cache set according to the selected index. For example, as discussed in more detail below, the cache controller 210 may store the line in any entry (e.g., in any way) of a selected cache set corresponding to the selected index based on the bit positions of the index field and the tag field of the selected index.

Figure 4:
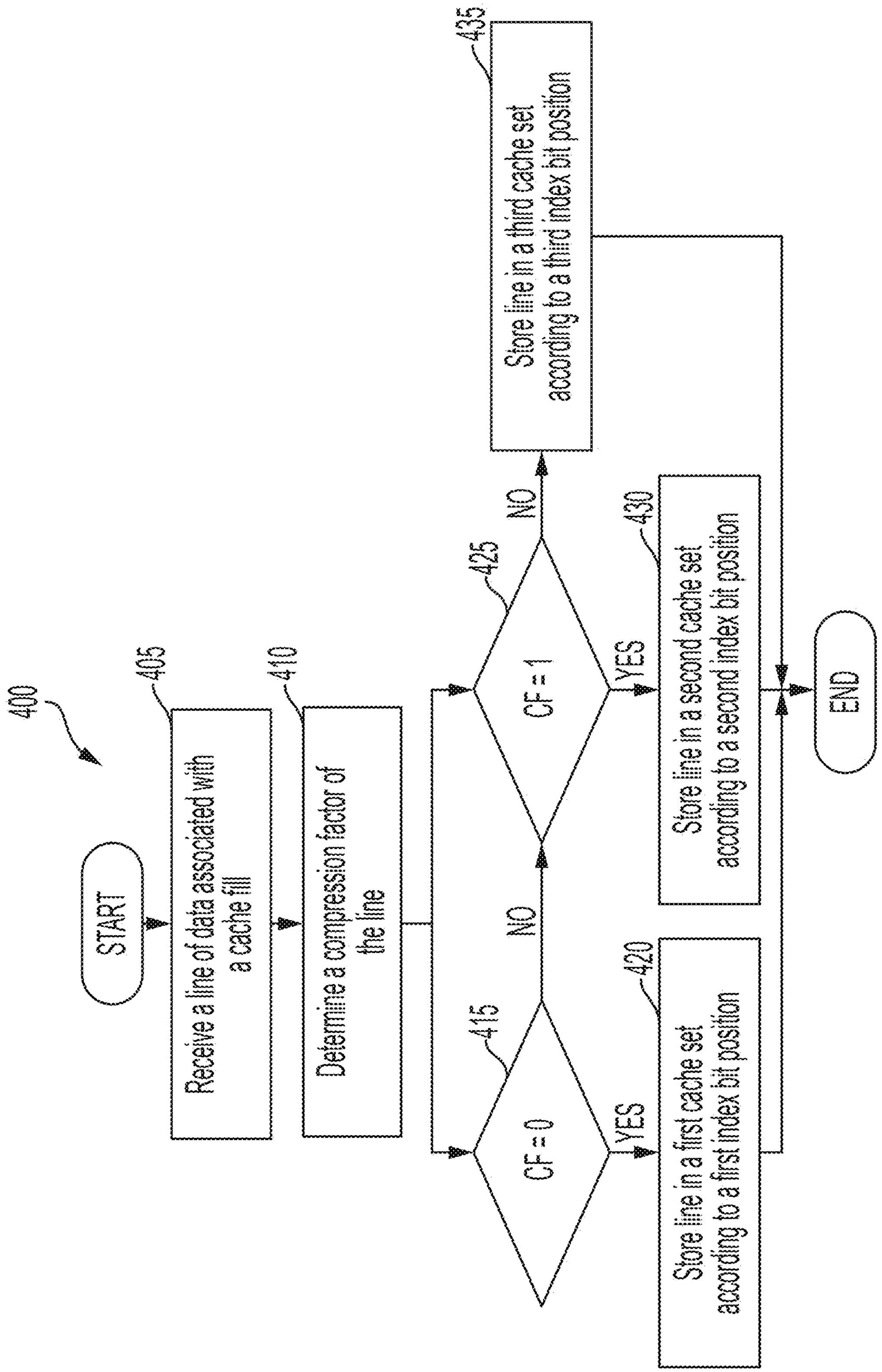
FIG. 4 illustrates a method for filling a cache according to one or more embodiments of the present disclosure.
Figure 5:
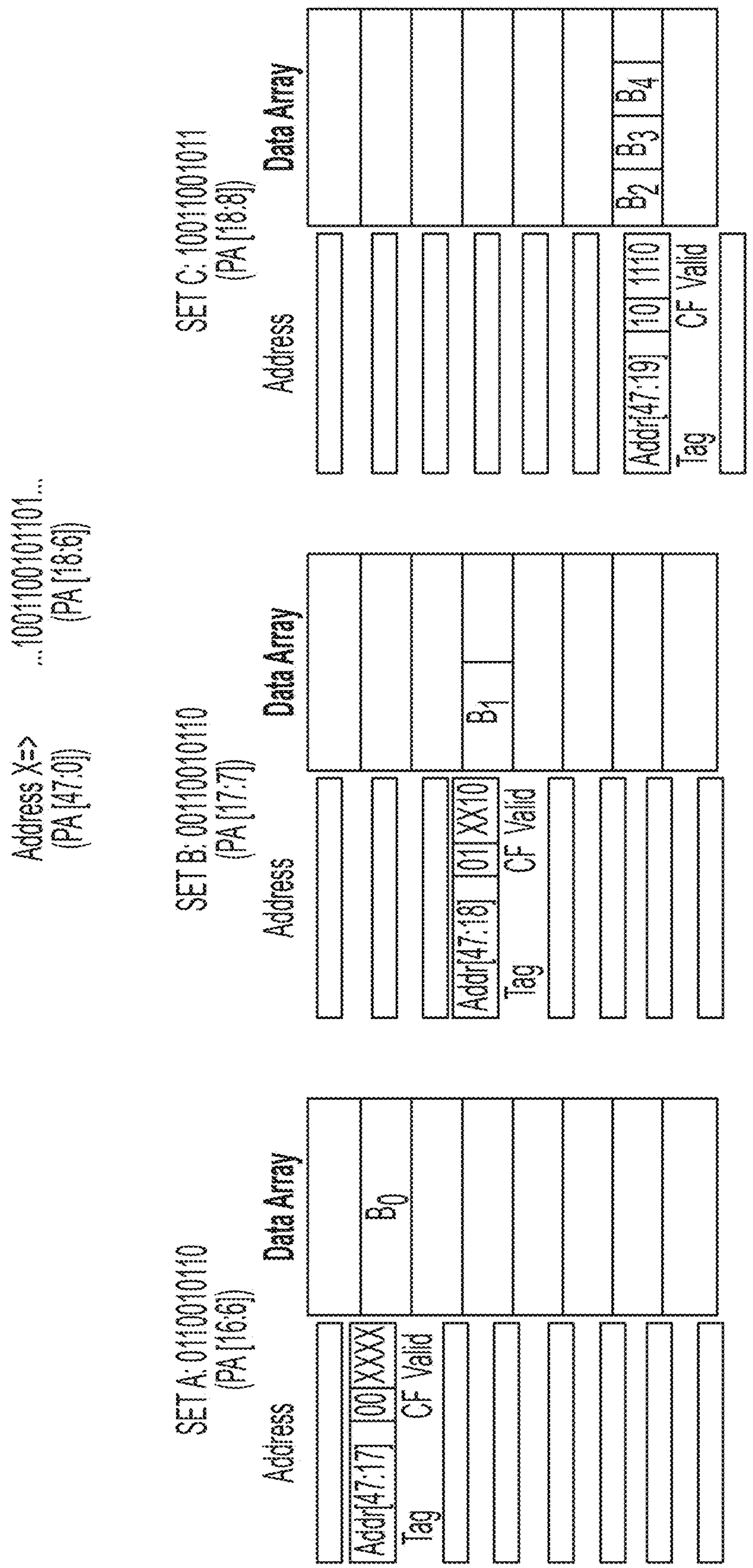
FIG. 5 illustrates a block diagram of an example of three different possible sets for a given address according to one or more embodiments of the present disclosure.

FIG. 4 illustrates a method for filling a cache according to one or more embodiments of the present disclosure. FIG. 5 illustrates a block diagram of an example of three different possible sets for a given address according to one or more embodiments of the present disclosure. As a representative example, FIG. 5 shows an 8-ways set-associative cache in which 3 potential sets (e.g., cache sets) are shown for a given address (Address X), each having a baseline cache of 1 MB, 8-way, 64 B lines. In other words, each way (e.g., each entry) of a cache set in FIG. 5 may hold one 64 B block of one uncompressed line, or one 64 B superblock of a plurality of (e.g., two or more) compressed lines.

Referring to FIG. 4, the method 400 may be performed by the cache controller 210 shown in FIG. 2. However, the present disclosure is not limited thereto, and the operations shown in the method 400 may be performed by any suitable one of the components and elements or any suitable combination of the components and elements of those of one or more example embodiments described above. Further, the present disclosure is not limited to the sequence or number of the operations of the method 400 shown in FIG. 4, and can be altered into any desired sequence or number of operations as recognized by a person having ordinary skill in the art. For example, in some embodiments, the order may vary, one or more of the operations shown in FIG. 4 may be performed concurrently with each other or sequentially, or the method 400 may include fewer or additional operations.

As shown in FIG. 4, the method 400 may start, and a line of data associated with a cache fill may be received at block 405. For example, in some embodiments, the cache controller 210 may receive a first instruction (e.g., a write instruction) from the processor/controller 205 to store one or more lines of data corresponding to a given address (e.g., Address X) associated with the first instruction in the cache memory 215. As another example, in response to a cache miss for a lookup of a given address (e.g., Address X) corresponding to a second instruction (e.g., a read instruction), the cache controller 210 may retrieve a line of data (e.g., from the host memory 108, the storage memory 114, an external memory, or the like) corresponding to the address for storing in the cache memory 215.

A compression factor CF of the line may be determined at block 410. For example, in some embodiments, the one or more lines of data to be stored may each be in a compressed format or an uncompressed format, and the compression factor CF of the line may be determined at the time the line is compressed (or not compressed). Accordingly, in some embodiments, the cache controller 210 may receive, retrieve, or otherwise determine the compression factor CF of the line to be stored, for example, from metadata associated with the line to be stored.

Based on the determined compression factor CF of the line, a cache set may be dynamically selected from among a plurality of possible cache sets for the address at blocks 415, 425, and 435. For example, in some embodiments, when the compression factor CF of the line to be stored is equal to 0 (e.g., YES at block 415), indicating that the line to be stored is uncompressed, the line may be stored in a first cache set according to a first index bit position at block 420. When the compression factor CF of the line to be stored is equal to 1 (e.g., YES at block 425), indicating that the line to be stored may be compressed into a smaller chunk (e.g., a 32 B chunk) and two such chunks can fit within one 64 B block (e.g., one 64 B superblock), the line may be stored in a second cache set according to a second index bit position at block 430. When the compression factor CF of the line to be stored is equal to 2 (e.g., NO at block 425), indicating that the line to be stored may be compressed into an even smaller chunk (e.g., a 16 B chunk) and four such chunks can fit within one 64 B block (e.g., one 64 B superblock), the line may be stored in a third cache set according to a third index bit position at block 435.

While a configuration in which the compression factor CF can be one of three compression factors CF (e.g., 0 to 2) is illustrated, the present disclosure is not limited thereto, and it should be appreciated that if the line can be even further compressed into even a smaller chunk (e.g., a 8 B chunk) and eight such chunks can fit within one 64 B block (e.g., one 64 B superblock), then such a line may be stored in a fourth cache set according to a fourth index bit position, and so on. Further, while a configuration in which the lines may be compressed by a power of 2 is illustratively described, the present disclosure is not limited thereto, and any suitable configuration in which the lines may be compressed by any suitable unit, power, or ratio (e.g., a compression ratio or a compression factor CF) may be applied.

According to some embodiments, the bit positions of the index bits for the different cache sets may be different from each other. For example, the first, second, and third index bit positions may be different from each other. In some embodiments, the first index bit position may have the lowest bit position range (e.g., may use the least significant bits) from among the first, second, and third index bit positions. For example, in some embodiments, the first index bit position may be the same as the index bit position corresponding to (e.g., indicated from) the address. In some embodiments, the second index bit position may have a bit position range greater than (e.g., using more significant bits than those of) the bit position range of the first index bit position, and the third index bit position may have a bit position range greater than (e.g., using more significant bits than those of) the bit position range of the second index bit position. For example, in some embodiments, the second index bit position may use bits that are shifted up by 1-bit from those of the first index bit position, and the third index bit position may use bits that are shifted up by 1-bit from those of the second index bit position (e.g., shifted up by 2-bits from those of the first index bit position), but the present disclosure is not limited thereto, and the index bit positions may be incrementally shifted by any suitable amount per an incremental shift in the compression factor CF.

As an example, referring to FIG. 5, assuming that an implementation of the cache system allows the lines to be stored to have compression factors anywhere from 0 (e.g., uncompressed) to 2 (e.g., such that the line can be compressed into a 16 B chunk and four 16 B chunks can fit one 64 B block), and a given address (e.g., Address X) for the line to be stored (e.g., corresponding to the cache fill) has bit positions 18 to 6 (e.g., PA[18:6]) having values of 1001100101101. In this case, depending on its compression factor CF, the line having the address X may be stored in one of three possible sets (e.g., indices), such as a first set (e.g., Set A) having an index at the first index bit position (e.g., PA[16:6]) of the address X (e.g., 01100101101) for a compression factor CF of 0, a second set (e.g., Set B) having an index at the second index bit position (e.g., PA[17:7]) of the address X (e.g., 00110010110) for a compression factor CF of 1, and a third set (e.g., Set B) having an index at the third bit position (e.g., PA[18:8]) of the address X (e.g., 10011001011) for a compression factor CF of 2.

As a result, in some embodiments, the bit positions of the tag field bits for the line may also be different depending on the different bit positions of the index bits for the different cache sets. For example, as shown in FIG. 5, the tag field bits for the first set (e.g., Set A) for a line having a compression factor of 0 may be located at bits 47 to 17 (e.g., PA[47:17]), the tag field bits for the second set (e.g., Set B) for a line having a compression factor of 1 may be located at bits 47 to 18 (e.g., PA[47:18]), and the tag field bits for the third set (e.g., Set C) for a line having a compression factor of 2 may be located at bits 47 to 19 (e.g., PA[47:19]). In other words, as the compression factor CF of the line increases, the number of available bits for the tag field for that line may be correspondingly decreased.

Further, in some embodiments, as the compression factor CF of a line increases, the number of valid field bits for that line may be increased. In some embodiments, the number of valid field bits may correspond to the number of bits in which the index field bits are shifted for a corresponding compression factor CF. Each time the index bits are shifted left, one more PA bit is added to the valid field bits, but the total lines increase exponentially. So "n valid field bits" from the address would be used to store a unique valid bit for each of $2^n$ lines. For example, as shown in FIG. 5, when the compression factor CF for the line is equal to 0, there may be no valid field bits (or there may be some junk or don't care valid field bits) associated for the line (e.g., as shown in the first set Set A), and the index field bits for the compression factor CF of 0 may be the same as those of the index field bits (e.g., PA[16:6]) for the given address (e.g., Address X). As another example, when the compression factor CF for the line is equal to 1, there may be 1 valid field bit (e.g., as a bit below the index field bits for that set, such as PA[6]), such that the index field bits (e.g., PA[17:7]) of the index field may be shifted by 1-bit compared to the index field bits for a typical uncompressed line. As another example, when the compression factor CF for the line is equal to 2, there may be 2 valid field bits (e.g., as bits below the index field bits for that set, such as PA[7:6]), such that the index field bits (e.g., PA[18:8]) of the index field may be shifted by 2-bits compared to the index field bits for a typical uncompressed cache.

While FIG. 5 shows an example in which the line having a compression factor of 0 is stored in the first set (e.g., Set A), the line having a compression factor of 1 is stored in the second set (e.g., Set B), and the line having a compression factor of 2 is stored in the third set (e.g., Set C), it should be appreciated that each entry (e.g., each way) of each set may store a line having any suitable compression factor. For example, in some embodiments, another given address for another line to be stored may have bit positions 18 to 6 (e.g., PA[18:6]) having values of 0100110010110. In this case, depending on its compression factor CF, the other line may be stored in any entry (e.g., in any way) of one of three possible sets (e.g., indices) for the address of the other line, such as the second set (e.g., Set B) having the index at the first index bit position (e.g., PA[16:6]) of the other address (e.g., 00110010110) for a compression factor CF of 0, the third set (e.g., Set C) having the index at the second index bit position (e.g., PA[17:7]) of the other address (e.g., 10011001011) for a compression factor CF of 1, and a fourth set (not shown) having an index at the third bit position (e.g., PA[18:8]) of the other address (e.g., 01001100101) for a compression factor CF of 2.

According to some embodiments, while the compression factor CF of the line to be stored may be known at the time of a cache fill as described above, upon an address lookup (e.g., a tag lookup), however, the cache controller 210 may not know the compression factor CF from the given address for the lookup For example, the address received or determined by the cache controller for the address lookup may have a format similar to that of the uncompressed line described above with reference to FIG. 3A. In this case, the address for the lookup may simply include sequential bits including bits corresponding to a tag field, bits corresponding to an index field, and bits corresponding to an offset field, for example, but as discussed above, the index field bits and the tag field bits may be set (e.g., may be selected) at different positions (e.g., may be shifted or reduced) according to the compression factor CF of the line during the cache fill. As such, in some embodiments, the cache controller 210 may check all possible cache sets (e.g., cache indices) for the given address to determine a cache hit (or a cache miss) for a corresponding line, which will be described in more detail below.

Figure 6A:
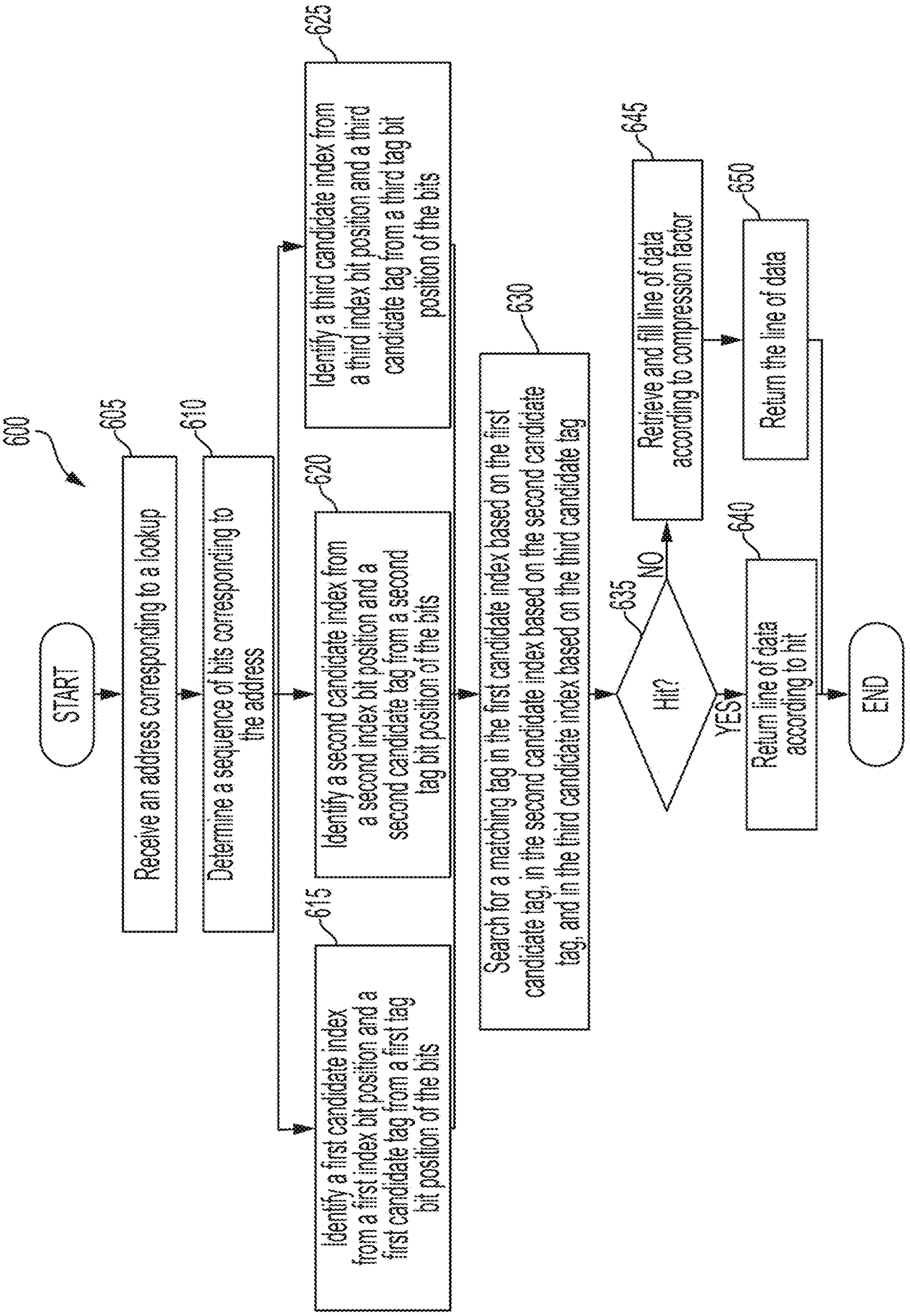
FIG. 6A illustrates a method for an address lookup according to one or more embodiments of the present disclosure.
Figure 6B:
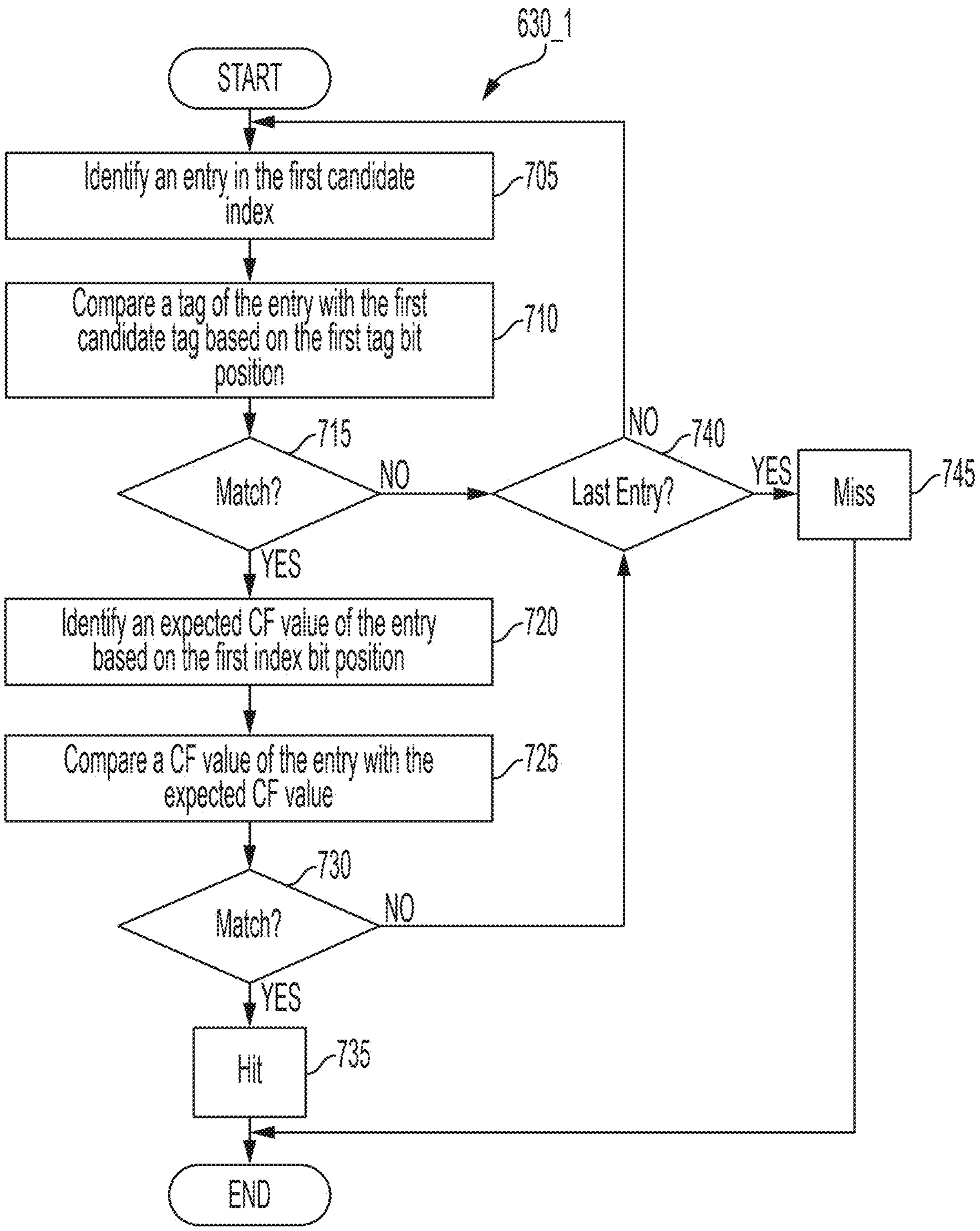
FIG. 6B illustrates a method for determining a cache hit or a cache miss in a first candidate index of the address in an address lookup according to one or more embodiments of the present disclosure.
Figure 6C:
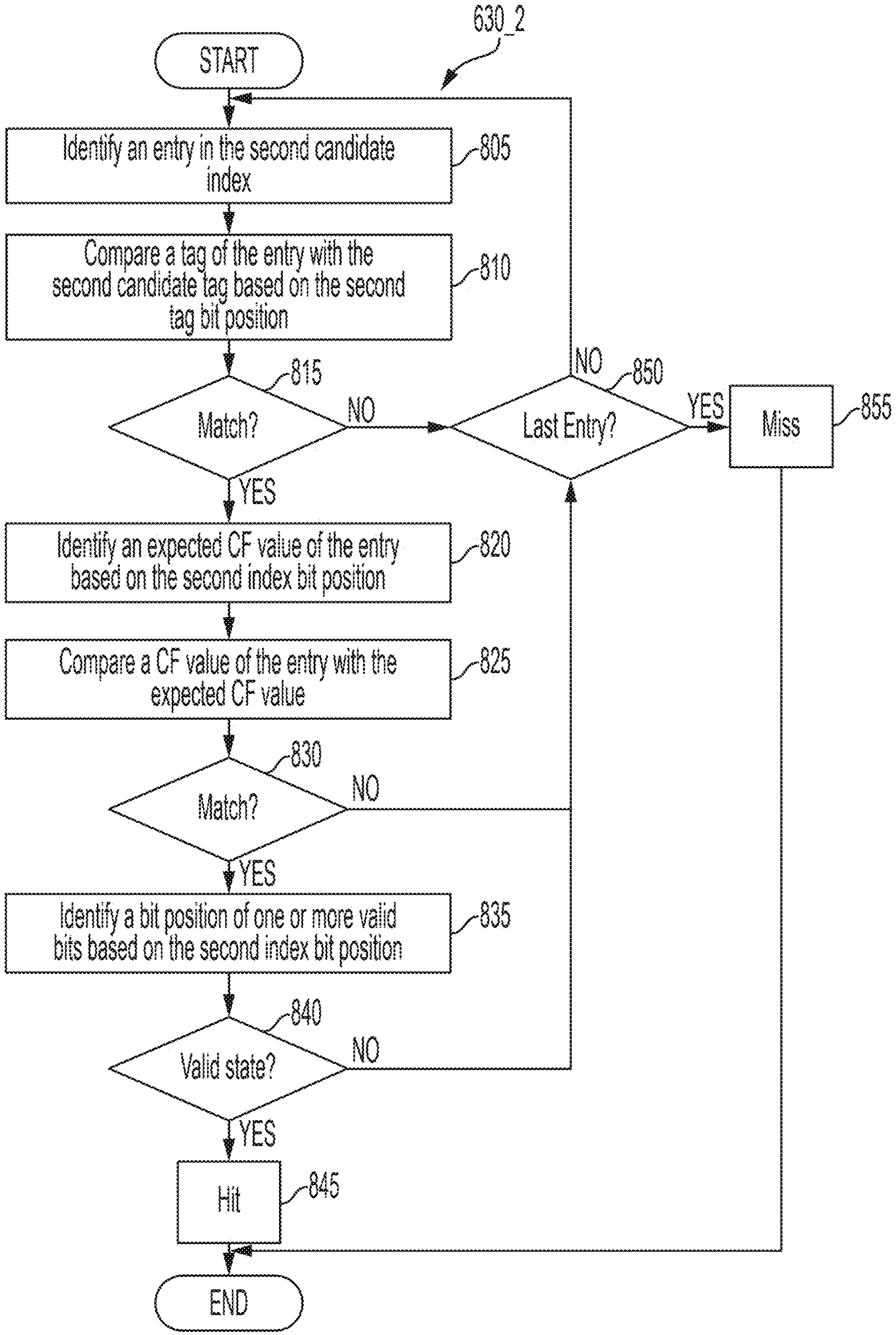
FIG. 6C illustrates a method for determining a cache hit or a cache miss in a second candidate index of the address in an address lookup according to one or more embodiments of the present disclosure.

FIG. 6A illustrates a method for an address lookup according to one or more embodiments of the present disclosure. FIG. 6B illustrates a method for determining a cache hit or a cache miss in a first candidate index of the address in an address lookup according to one or more embodiments of the present disclosure. FIG. 6C illustrates a method for determining a cache hit or a cache miss in a second candidate index of the address in an address lookup according to one or more embodiments of the present disclosure.

Referring to FIGS. 6A to 6C, the methods 600, 630_1, and 630_2 may be performed by the cache controller 210 shown in FIG. 2. However, the present disclosure is not limited thereto, and the operations shown in the methods 600, 630_1, and 630_2 may be performed by any suitable one of the components and elements or any suitable combination of the components and elements of those of one or more example embodiments described above. Further, the present disclosure is not limited to the sequence or number of the operations of the methods 600, 630_1, and 630_2 shown in FIGS. 6A to 6C, and can be altered into any desired sequence or number of operations as recognized by a person having ordinary skill in the art. For example, in some embodiments, the order may vary, one or more of the operations shown in FIGS. 6A to 6C may be performed concurrently with each other or sequentially, or the methods 600, 630_1, and 630_2 may include fewer or additional operations.

Referring to FIG. 6A, the method 600 may start, and an address corresponding to a lookup may be received at block 605. For example, in some embodiments, the cache controller 210 may receive an address and an instruction (e.g., a read instruction) from the processor/controller 205 to retrieve data at a location corresponding to the address, and the cache controller 210 may check the cache memory 215 to see if it has the data corresponding to the address stored therein.

In some embodiments, the cache controller 210 may determine a sequence of bits corresponding to the address at block 610. For example, in some embodiments, the sequence of bits corresponding to the address may include the tag field bits, the index field bits, and the offset field bits of a typical uncompressed cache (e.g., see FIG. 3A). As such, the cache controller 210 may not know the compression factor CF associated with the address, and thus, may not know which of the address bits (e.g., the sequential bits) of the address correspond to the set index bits (e.g., the selected index bits when the cache memory 215 was filled).

In some embodiments, the cache controller 210 may check all potential set indices for the address (e.g., for the particular sequence of bits) for a cache hit of a line that may be stored (e.g., that may be cached) for the address in the cache memory 215. For example, assuming an implementation in which the lines of data having a compression factor of 0, 1, or 2 can be stored, and thus, 3 total different possible compression factors CF, there may be 3 possible index bit positions for the given address, one for each possible compression factor CF, as discussed above. However, the present disclosure is not limited thereto, and it should be appreciated that any suitable number of compression factors CF may be used, such that the number of possible index bit positions for a given address may depend on the number of possible compression factors CF in a one-to-one correspondence.

As an example, referring again to FIG. 5, assume that the given address (e.g., Address X) for the lookup has sequential bits in positions 18 to 6 (e.g., PA[18:6]) having values of 1001100101101. In this case, because the compression factor CF is not known at the time of the lookup, the sequential bits for the address (e.g., Address X) may have an index at the first index bit position (e.g., PA[16:6] corresponding to CF=0), an index at the second index bit position (e.g., PA[17:7] corresponding to CF=1), or an index at the third index bit position (e.g., PA[18:8] corresponding to CF=2).

Accordingly, in some embodiments, a first candidate index may be identified from a first index bit position and a first candidate tag may be identified from a first tag bit position of the bits at block 615, a second candidate index may be identified from a second index bit position and a second candidate tag may be identified from a second tag bit position of the bits at block 620, and a third candidate index may be identified from a third index bit position and a third candidate tag may be identified from a third tag bit position of the bits at block 625. The operations of blocks 615, 620, and 625 may be performed concurrently or sequentially with each other. For example, referring to FIG. 5, the address (e.g., Address X) for the lookup may have the first candidate index at 01100101101 for the first index bit position (e.g., PA[16:6]) and the first candidate tag at a first tag bit position (e.g., PA[47:17]), the second candidate index at 00110010110 for the second index bit position (e.g., PA[17:7]) and the second candidate tag at a second tag bit position (e.g., PA[47:18]), and the third candidate index at 10011001011 for the third index bit position (e.g., PA[18:8]) and the third candidate tag at a third tag bit position (e.g., PA[47:19]) from among the bits of the Address X (e.g., having PA[18:6] of 1001100101101).

As such, according to some embodiments, a matching tag may be searched for in the first candidate index based on the first candidate tag, in the second candidate index based on the second candidate tag, and in the third candidate index based on the third candidate tag at block 630. For example, referring to FIG. 5, each of the entries (e.g., each of the ways) in the first candidate index (e.g., Set A) may be searched for a match of the first candidate tag (e.g., at the first tag bit position), each of the entries (e.g., each of the ways) in the second candidate index (e.g., Set B) may be searched for a match of the second candidate tag (e.g., at the second tag bit position), and each of the entries (e.g., each of the ways) in the third candidate index (e.g., Set C) may be searched for a match of the third candidate tag (e.g., at the third tag bit position). The search for the matching tag in each of the first candidate index, the second candidate index, and the third candidate index may be performed concurrently or sequentially.

In more detail, referring to FIG. 6B, in some embodiments, block 630 may include method 630_1, in which each of the entries in the first candidate index may be searched for a matching tag based on the first candidate tag (which may be performed concurrently or sequentially, depending on an implementation). For example, the method 630_1 may start, and an entry (e.g., a way) may be identified in the first candidate index at block 705, and a tag of the entry may be compared with the first candidate tag based on the first tag bit position at block 710. If there is a match (e.g., YES at block 715), an expected compression factor CF value of the entry may be identified based on the first index bit position at block 720, and a compression factor CF value of the entry may be compared with the expected compression factor CF value at block 725. For example, while the cache controller 210 may not know the compression factor CF of the address (e.g., Address X) for the lookup, it may know that the compression factor CF for the first index bit position (e.g., PA[16:6]) should be 0, and thus, a matching tag for the first index bit position should also have a compression factor CF value corresponding to 0.

If the compression factor CF values match (e.g., YES at block 730), the cache controller 210 may determine that there is a cache hit in the first candidate index at block 735 (e.g., corresponding to YES at block 635 of FIG. 6A), and the method 630_1 may end, such that the method 400 may continue at block 635 of the method 600 for a hit (e.g., YES at block 635), which will be described in more detail below. Here, because the first candidate index should have a compression factor CF of 0, indicating that any corresponding line should be uncompressed, the cache controller 210 may not care about any valid bits (which may not exist, or may exist as don't care bits), and thus, may determine a cache hit in the first candidate index if the tags match and the compression factor CF of the entry indicates that the corresponding line is uncompressed.

On the other hand, if the tag of the entry does not match the first candidate tag (e.g., NO at block 715), or if the compression factor CF value of the entry does not match the expected compression factor CF value (e.g., NO at block 730), the cache controller 210 may determine if there are any other entries in the first candidate index to be checked at block 740. If there are other entries in the first candidate index to be checked (e.g., NO at block 740), the method 630_1 may continue at block 705 for each of the other entries to be checked. On the other hand, if there are no more entries in the first candidate index (e.g., YES at block 740), the cache controller 210 may determine that the first candidate index does not store the corresponding line of data for the given address, and thus, may determine a cache miss for the first candidate index at block 745, and the method 630_1 may end. For example, upon determining the cache miss for the first candidate index at block 745, the method 400 may continue at block 635 of the method 600 for a determined hit (e.g., YES at block 635) in any of the other candidate indices. However, the present disclosure is not limited thereto, and in some embodiments, each of the entries of a candidate set may be checked for a hit or a miss concurrently, and in this case, block 740 may be omitted and in case of a NO determination at any of blocks 715 and 730, the corresponding entry may be identified as a miss at block 745.

Referring to FIG. 6C, in some embodiments, block 630 may include method 630_2, in which each of the entries in the second candidate index may be searched for a matching tag based on the second candidate tag. The method for searching each of the entries in the third candidate index for a matching tag based on the third candidate tag may be the same or substantially the same as the method 630_2 illustrated in FIG. 6C, except for the positions of the bits for the index field, the tag field, and the valid field may be different, and thus, the differences therebetween may be mainly described with reference to FIG. 6C, and redundant description thereof may not be repeated.

As shown in FIG. 6C, the method 630_2 may start, and an entry (e.g., a way) may be identified in the second candidate index at block 805, and a tag of the entry may be compared with the second candidate tag based on the second tag bit position at block 810. If there is a match (e.g., YES at block 815), an expected compression factor CF value of the entry may be identified based on the second index bit position at block 820, and a compression factor CF value of the entry may be compared with the expected compression factor CF value at block 825. For example, while the cache controller 210 may not know the compression factor CF value of the address (e.g., Address X) for the lookup, it may know that the compression factor CF value for the second index bit position (e.g., PA[17:7]) should be 1, and thus, a matching tag for the second index bit position should also have a compression factor CF value corresponding to 1. Similarly, the cache controller 210 may know the compression factor CF value for the third index bit position (e.g., PA[18:8]) should be 2, and thus, a matching tag for the third index bit position in a lookup in the third candidate index should also have a compression factor CF value corresponding to 2.

If the compression factor CF values match (e.g., YES at block 830), the cache controller 210 may identify a bit position of one or more valid field bits in the tag of the entry based on the second index bit position (or the third index bit position) at block 835, and may determine whether or not the one or more valid field bits for entry indicate a valid state at block 840. Here, because the second candidate index should have a compression factor CF of 1, and the third candidate index should have a compression factor CF of 2, indicating that any corresponding line that may be stored is compressed and/or the amount of which the line is compressed, the cache controller 210 may check the valid bits for that entry (which may be based on the bit position of the corresponding index bits), to insure that the entry corresponds to valid compressed lines based on the compression factor CF. For example, for the second candidate index, a 1-bit valid field (e.g., PA[6]) may be located below the second index bit position (e.g., PA[17:7]), along with two valid bits for each line with unique PA[6]. And for the third candidate index, a 2-bit valid field (e.g., PA[7:6]) may be located below the third index bit position (e.g., PA[18:8]), along with four valid bits for each line with unique PA[7:6].

As such, the cache controller 210 may determine whether or not the one or more valid field bits for the entry of a corresponding second or third candidate index indicate a valid state at block 840, and if so (e.g., YES at block 840), the cache controller 210 may determine that there is a cache hit in the second candidate index (or the third index) at block 845 (e.g., corresponding to YES at block 635 of FIG. 6A), and the method 630_2 may end, such that the method 400 may continue at block 635 of the method 600 for a hit (e.g., YES at block 635), which will be described in more detail below.

On the other hand, if the tag of the entry does not match the second candidate tag (e.g., NO at block 815), or if the CF value of the entry does not match the expected CF value (e.g., NO at block 830), or if the one or more valid bits of the entry does not indicate a valid state (e.g., NO at block 840), the cache controller 210 may determine if there are any other entries in the second candidate index to be checked at block 850. If there are other entries in the second candidate index to be checked (e.g., NO at block 850), the method 630_2 may continue at block 805 for each of the other entries to be checked. On the other hand, if there are no more entries in the second candidate index (e.g., YES at block 850), the cache controller 210 may determine that the second candidate index does not store the corresponding line of data for the given address, and thus, may determine a cache miss for the second candidate index at block 855, and the method 630_2 may end. For example, upon determining the cache miss for the second candidate index at block 855, the method 400 may continue at block 635 of the method 600 for a hit (e.g., YES at block 635) in any of the other candidate indices. However, the present disclosure is not limited thereto, and in some embodiments, each of the entries of a candidate set may be checked for a hit or a miss concurrently, and in this case, block 850 may be omitted and in case of a NO determination at any of blocks 815, 830, and 840, the corresponding entry may be identified as a miss at block 855.

Referring to FIG. 6A, in response to a hit (e.g., YES at block 635) in any one of the first candidate index, the second candidate index, or the third candidate index at block 735 of FIG. 6B or at block 845 in FIG. 6C, the cache controller 210 may return a line of data according to the hit (e.g., referenced by the matching entry) at block 640, and the method 600 may end. It should be noted that here, if the line corresponding to the given address for the lookup is stored in the cache memory 215, a hit will occur in only one of the possible sets for the given address of the line.

On the other hand, in response to a miss (e.g., NO at block 635) in all of the first candidate index, the second candidate index, and the third candidate index at block 745 of FIG. 6B or at block 855 in FIG. 6C, the cache controller 210 may retrieve a line of data corresponding to the given address (e.g., from the host memory 108, the storage memory 114, an external memory, or the like), and may fill the line of data according to a compression factor CF of the line at block

645. For example, when the line of data is retrieved for the cache fill, the cache controller 210 may now know the compression factor CF of the line of data (e.g., from metadata associated therewith), and thus, may fill the cache memory 215 according to the compression factor CF of the line of data (e.g., based on the method 400 described above with reference to FIG. 4). The cache controller 210 may also return the line of data at block 650 to complete the original instruction, and the method 600 may end.

Figure 7:
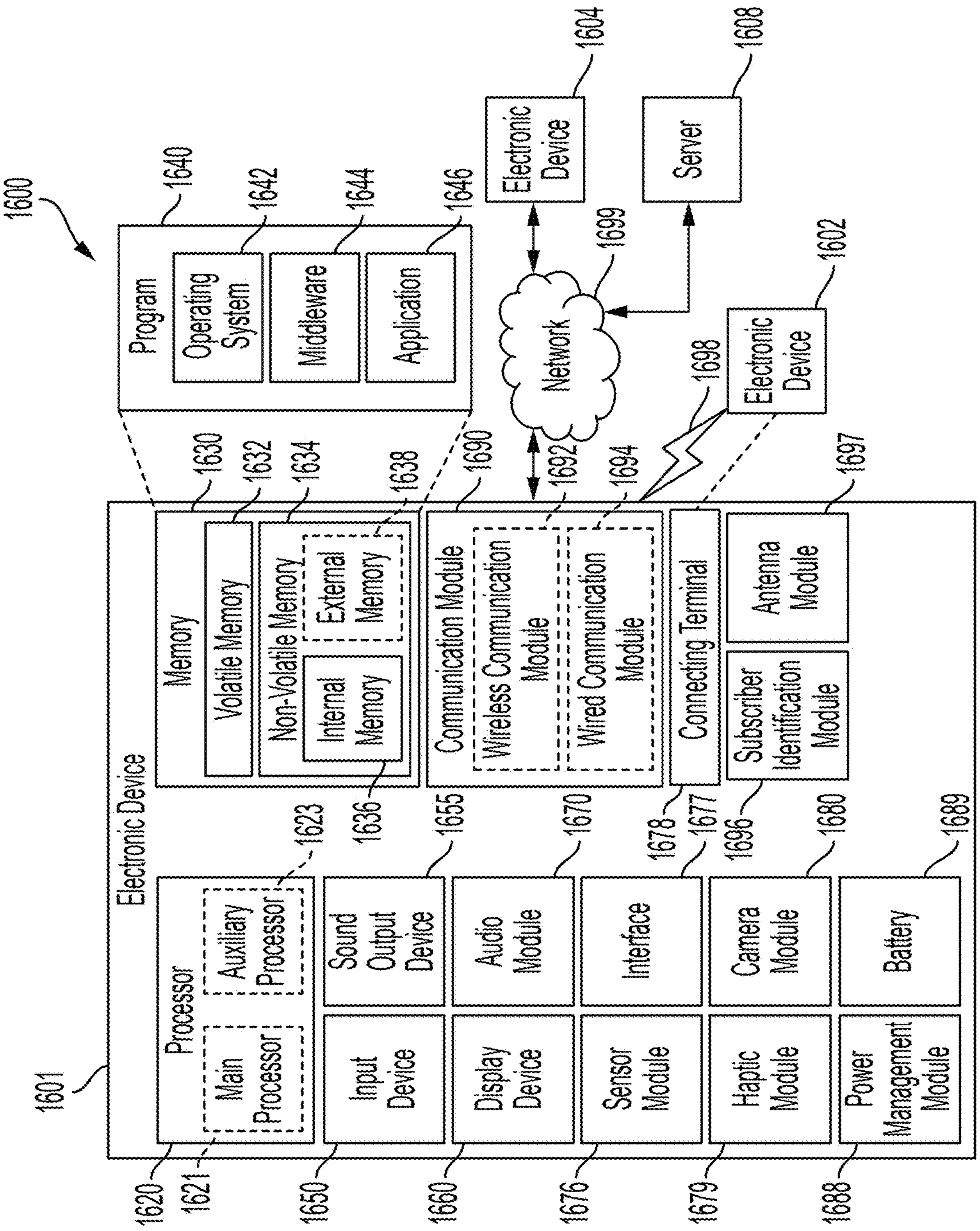
FIG. 7 is a block diagram of an electronic device in a network environment, according to an embodiment of the present disclosure.

FIG. 7 is a block diagram of an electronic device in a network environment 1600, according to an embodiment of the present disclosure. For example, in some embodiments, the system 100 and/or 200 may include, or may be implemented as, the electronic device illustrated in FIG. 7.

Referring to FIG. 7, an electronic device 1601 in a network environment 1600 may communicate with an electronic device 1602 via a first network 1698 (e.g., a short-range wireless communication network), or an electronic device 1604 or a server 1608 via a second network 1699 (e.g., a long-range wireless communication network). The electronic device 1601 may communicate with the electronic device 1604 via the server 1608. The electronic device 1601 may include a processor 1620, a memory 1630, an input device 1650, a sound output device 1655, a display device 1660, an audio module 1670, a sensor module 1676, an interface 1677, a haptic module 1679, a camera module 1680, a power management module 1688, a battery 1689, a communication module 1690, a subscriber identification module (SIM) card 1696, or an antenna module 1697. In one embodiment, at least one (e.g., the display device 1660 or the camera module 1680) of the components may be omitted from the electronic device 1601, or one or more other components may be added to the electronic device 1601. Some of the components may be implemented as a single integrated circuit (IC). For example, the sensor module 1676 (e.g., a fingerprint sensor, an iris sensor, or an illuminance sensor) may be embedded in the display device 1660 (e.g., a display).

The processor 1620 may execute software (e.g., a program 1640) to control at least one other component (e.g., a hardware or a software component) of the electronic device 1601 coupled with the processor 1620 and may perform various data processing or computations.

As at least part of the data processing or computations, the processor 1620 may load a command or data received from another component (e.g., the sensor module 1676 or the communication module 1690) in volatile memory 1632, process the command or the data stored in the volatile memory 1632, and store resulting data in non-volatile memory 1634. The processor 1620 may include a main processor 1621 (e.g., a central processing unit (CPU) or an application processor (AP)), and an auxiliary processor 1623 (e.g., a graphics processing unit (GPU), an image signal processor (ISP), a sensor hub processor, or a communication processor (CP)) that is operable independently from, or in conjunction with, the main processor 1621. Additionally or alternatively, the auxiliary processor 1623 may be adapted to consume less power than the main processor 1621, or execute a particular function. The auxiliary processor 1623 may be implemented as being separate from, or a part of, the main processor 1621.

The auxiliary processor 1623 may control at least some of the functions or states related to at least one component (e.g., the display device 1660, the sensor module 1676, or the communication module 1690) among the components of the electronic device 1601, instead of the main processor 1621 while the main processor 1621 is in an inactive (e.g., sleep) state, or together with the main processor 1621 while the main processor 1621 is in an active state (e.g., executing an application). The auxiliary processor 1623 (e.g., an image signal processor or a communication processor) may be implemented as part of another component (e.g., the camera module 1680 or the communication module 1690) functionally related to the auxiliary processor 1623.

The memory 1630 may store various data used by at least one component (e.g., the processor 1620 or the sensor module 1676) of the electronic device 1601. The various data may include, for example, software (e.g., the program 1640) and input data or output data for a command related thereto. The memory 1630 may include the volatile memory 1632 or the non-volatile memory 1634. Non-volatile memory 1634 may include internal memory 1636 and/or external memory 1638.

The program 1640 may be stored in the memory 1630 as software, and may include, for example, an operating system (OS) 1642, middleware 1644, or an application 1646.

The input device 1650 may receive a command or data to be used by another component (e.g., the processor 1620) of the electronic device 1601, from the outside (e.g., a user) of the electronic device 1601. The input device 1650 may include, for example, a microphone, a mouse, or a keyboard.

The sound output device 1655 may output sound signals to the outside of the electronic device 1601. The sound output device 1655 may include, for example, a speaker or a receiver. The speaker may be used for general purposes, such as playing multimedia or recording, and the receiver may be used for receiving an incoming call. The receiver may be implemented as being separate from, or a part of, the speaker.

The display device 1660 may visually provide information to the outside (e.g., a user) of the electronic device 1601. The display device 1660 may include, for example, a display, a hologram device, or a projector and control circuitry to control a corresponding one of the display, hologram device, and projector. The display device 1660 may include touch circuitry adapted to detect a touch, or sensor circuitry (e.g., a pressure sensor) adapted to measure the intensity of force incurred by the touch.

The audio module 1670 may convert a sound into an electrical signal and vice versa. The audio module 1670 may obtain the sound via the input device 1650 or output the sound via the sound output device 1655 or a headphone of an external electronic device 1602 directly (e.g., wired) or wirelessly coupled with the electronic device 1601.

The sensor module 1676 may detect an operational state (e.g., power or temperature) of the electronic device 1601 or an environmental state (e.g., a state of a user) external to the electronic device 1601, and then generate an electrical signal or data value corresponding to the detected state. The sensor module 1676 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1677 may support one or more specified protocols to be used for the electronic device 1601 to be coupled with the external electronic device 1602 directly (e.g., wired) or wirelessly. The interface 1677 may include, for example, a high-definition multimedia interface (HDMI), a universal serial bus (USB) interface, a secure digital (SD) card interface, or an audio interface.

A connecting terminal 1678 may include a connector via which the electronic device 1601 may be physically connected with the external electronic device 1602. The connecting terminal 1678 may include, for example, an HDMI connector, a USB connector, an SD card connector, or an audio connector (e.g., a headphone connector).

The haptic module 1679 may convert an electrical signal into a mechanical stimulus (e.g., a vibration or a movement) or an electrical stimulus which may be recognized by a user via tactile sensation or kinesthetic sensation. The haptic module 1679 may include, for example, a motor, a piezoelectric element, or an electrical stimulator.

The camera module 1680 may capture a still image or moving images. The camera module 1680 may include one or more lenses, image sensors, image signal processors, or flashes. The power management module 1688 may manage power supplied to the electronic device 1601. The power management module 1688 may be implemented as at least part of, for example, a power management integrated circuit (PMIC).

The battery 1689 may supply power to at least one component of the electronic device 1601. The battery 1689 may include, for example, a primary cell which is not rechargeable, a secondary cell which is rechargeable, or a fuel cell.

The communication module 1690 may support establishing a direct (e.g., wired) communication channel or a wireless communication channel between the electronic device 1601 and the external electronic device (e.g., the electronic device 1602, the electronic device 1604, or the server 1608) and performing communication via the established communication channel. The communication module 1690 may include one or more communication processors that are operable independently from the processor 1620 (e.g., the AP) and supports a direct (e.g., wired) communication or a wireless communication. The communication module 1690 may include a wireless communication module 1692 (e.g., a cellular communication module, a short-range wireless communication module, or a global navigation satellite system (GNSS) communication module) or a wired communication module 1694 (e.g., a local area network (LAN) communication module or a power line communication (PLC) module). A corresponding one of these communication modules may communicate with the external electronic device via the first network 1698 (e.g., a short-range communication network, such as BLUETOOTH™, wireless-fidelity (Wi-Fi) direct, or a standard of the Infrared Data Association (IrDA)) or the second network 1699 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 1692 may identify and authenticate the electronic device 1601 in a communication network, such as the first network 1698 or the second network 1699, using subscriber information (e.g., international mobile subscriber identity (IMSI)) stored in the subscriber identification module 1696.

The antenna module 1697 may transmit or receive a signal or power to or from the outside (e.g., the external electronic device) of the electronic device 1601. The antenna module 1697 may include one or more antennas, and, therefrom, at least one antenna appropriate for a communication scheme used in the communication network, such as the first network 1698 or the second network 1699, may be selected, for example, by the communication module 1690 (e.g., the wireless communication module 1692). The signal or the power may then be transmitted or received between the communication module 1690 and the external electronic device via the selected at least one antenna.

Commands or data may be transmitted or received between the electronic device 1601 and the external electronic device 1604 via the server 1608 coupled with the second network 1699. Each of the electronic devices 1602 and 1604 may be a device of a same type as, or a different type, from the electronic device 1601. All or some of operations to be executed at the electronic device 1601 may be executed at one or more of the external electronic devices 1602, 1604, or 1608. For example, if the electronic device 1601 should perform a function or a service automatically, or in response to a request from a user or another device, the electronic device 1601, instead of, or in addition to, executing the function or the service, may request the one or more external electronic devices to perform at least part of the function or the service. The one or more external electronic devices receiving the request may perform the at least part of the function or the service requested, or an additional function or an additional service related to the request and transfer an outcome of the performing to the electronic device 1601. The electronic device 1601 may provide the outcome, with or without further processing of the outcome, as at least part of a reply to the request. To that end, a cloud computing, distributed computing, or client-server computing technology may be used, for example.

Figure 8:
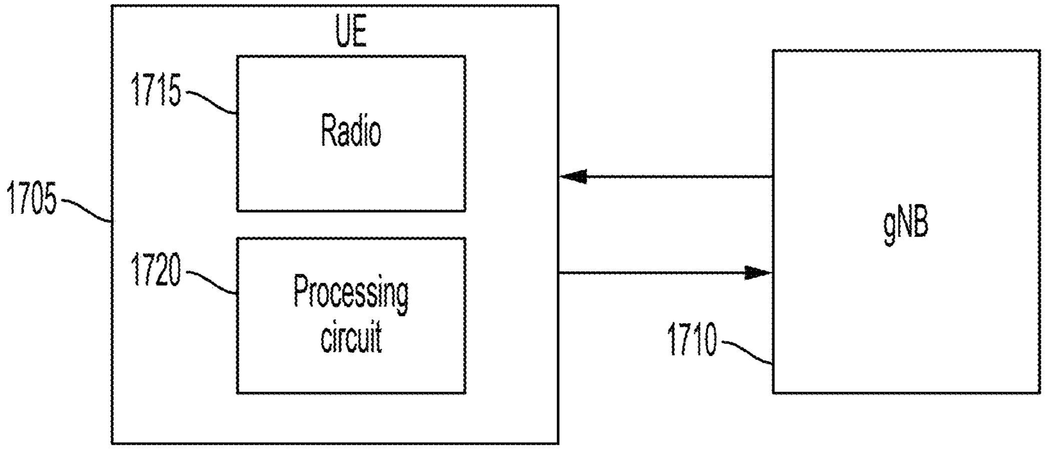
FIG. 8 shows a system including a UE and a gNB in communication with each other.

FIG. 8 shows a system including a UE 1705 and a gNB 1710 in communication with each other. The UE may include a radio 1715 and a processing circuit (or a means for processing) 1720, which may perform various methods disclosed herein, e.g., the methods illustrated in FIGS. 2-15. For example, the processing circuit 1720 may receive, via the radio 1715, transmissions from the network node (gNB) 1710, and the processing circuit 1720 may transmit, via the radio 1715, signals to the gNB 1710.

Embodiments of the subject matter and the operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer-program instructions, encoded on computer-storage medium for execution by, or to control the operation of data-processing apparatus. Alternatively or additionally, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer-storage medium can be, or be included in, a computer-readable storage device, a computer-readable storage substrate, a random or serial-access memory array or device, or a combination thereof. Moreover, while a computer-storage medium is not a propagated signal, a computer-storage medium may be a source or destination of computer-program instructions encoded in an artificially-generated propagated signal. The computer-storage medium can also be, or be included in, one or more separate physical components or media (e.g., multiple CDs, disks, or other storage devices). Additionally, the operations described in this specification may be implemented as operations performed by a data-processing apparatus on data stored on one or more computer-readable storage devices or received from other sources.

While this specification may contain many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described herein. Other embodiments are within the scope of the following claims. In some cases, the actions set forth in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

The foregoing is illustrative of some embodiments of the present disclosure, and is not to be construed as limiting thereof. Although some embodiments have been described, those skilled in the art will readily appreciate that various modifications are possible in the embodiments without departing from the spirit and scope of the present disclosure. It will be understood that descriptions of features or aspects within each embodiment should typically be considered as available for other similar features or aspects in other embodiments, unless otherwise described. Thus, as would be apparent to one of ordinary skill in the art, features, characteristics, and/or elements described in connection with a particular embodiment may be used singly or in combination with features, characteristics, and/or elements described in connection with other embodiments unless otherwise specifically indicated. Therefore, it is to be understood that the foregoing is illustrative of various example embodiments and is not to be construed as limited to the specific embodiments disclosed herein, and that various modifications to the disclosed embodiments, as well as other example embodiments, are intended to be included within the spirit and scope of the present disclosure as defined in the appended claims, and their equivalents.

What is claimed is:

1. A system comprising:

cache memory; and a cache controller configured to:

store a line of data in the cache memory according to an address of the line and a compression ratio of the line; and return a requested line of data based on a search in a first candidate set of the cache memory having a first index at a first index bit position of an address of the requested line, and in a second candidate set of the cache memory having a second index at a second index bit position of the address of the requested line, wherein the first index bit position is different from the second index bit position.

2. The system of claim 1, wherein the second index bit position is shifted to one or more significant bits from the first index bit position.

3. The system of claim 2, wherein the first index bit position is the same as positions of index field bits of the address of the requested line, and the second index bit position is different from the index field bits of the address of the requested line.

4. The system of claim 1, wherein the compression ratio indicates a compression amount of the line, or a number of lines that one entry of the cache memory is to hold, and wherein to store the line of data in the cache memory, the cache controller is configured to:

determine the compression ratio of the line;

select a set of the cache memory having an index at one of the first index bit position or the second index bit position of the address of the line based on the compression ratio of the line; and store the line in the set.

5. The system of claim 4, wherein to select the set of the cache memory, the cache controller is further configured to:

determine that the compression ratio of the line has a first value indicating that the line is uncompressed; and select the index at the first index bit position of the address of the line, the first index bit position comprising one or more less significant bits compared to the second index bit position.

6. The system of claim 4, wherein to select the set of the cache memory, the cache controller is further configured to:

determine that the compression ratio of the line has a second value indicating that the line is compressed; and select the index at the second index bit position of the address of the line, the second index bit position comprising one or more significant bits compared to the first index bit position.

7. The system of claim 1, wherein to return the requested line of data, the cache controller is configured to:

determine a sequence of bits corresponding to the address of the requested line;

identify the first index of the first candidate set based on the first index bit position of the sequence of bits, and a first candidate tag from a first tag bit position of the sequence of bits;

identify the second index of the second candidate set based on the second index bit position of the sequence of bits, and a second candidate tag from a second tag bit position of the sequence of bits;

search an entry in the first candidate set based on the first candidate tag; and search an entry in the second candidate set based on the second candidate tag, wherein the first tag bit position is different from the second tag bit position.

8. The system of claim 7, wherein to search the entry in the first candidate set, the cache controller is further configured to:

compare a tag of the entry with the first candidate tag;

identify an expected compression ratio based on the first index bit position; and compare a compression ratio value of the entry with the expected compression ratio, wherein, in response to a match of each of the compares for the entry in the first candidate set, the controller is further configured to return the requested line associated with the entry from the first candidate set of the cache memory, and wherein, in response to a miss resulting from the searches in each of the first candidate set and the second candidate set, the cache controller is configured to return the requested line of data from another memory, and store the requested line of data in a set of the cache memory according to a compression ratio of the requested line of data.

9. The system of claim 7, wherein to search the entry in the second candidate set, the cache controller is further configured to:

compare a tag of the entry with the second candidate tag;

identify an expected compression ratio based on the second index bit position;

compare a compression ratio value of the entry with the expected compression ratio;

determine a state of one or more valid bits of the entry; and compare the state with a valid state, wherein, in response to a match of each of the compares for the entry in the second candidate set, the controller is further configured to return the requested line associated with the entry from the second candidate set of the cache memory, and wherein, in response to a miss of the searches in each of the first candidate set and the second candidate set, the cache controller is configured to return the requested line of data from another memory, and store the requested line of data in a set of the cache memory according to a compression ratio of the requested line of data.

10. A method for storing a line of data in a cache, comprising:

determining, by a cache controller, a compression ratio of the line;

selecting, by the cache controller, a set of a cache memory according to the compression ratio of the line, the set having an index at one of a first index bit position of an address of the line or a second index bit position of the address of the line; and storing, by the cache controller, the line in the set of the cache memory, wherein the first index bit position is different from the second index bit position, and wherein the second index bit position is shifted to one or more significant bits from the first index bit position.

11. The method of claim 10, wherein the first index bit position is the same as positions of index field bits of the address of the line, and the second index bit position is different from the index field bits of the address of the line.

12. The method of claim 10, wherein the compression ratio indicates a compression amount of the line, or a number of lines that one entry of the cache memory is to hold, and wherein the selecting of the set comprises:

determining, by the cache controller, that the compression ratio of the line has a first value indicating that the line is uncompressed; and selecting, by the cache controller, the index at the first index bit position of the address of the line, the first index bit position comprising one or more less significant bits compared to the second index bit position.

13. The method of claim 10, wherein the compression ratio indicates a compression amount of the line, or a number of lines that one entry of the cache memory is to hold, and wherein the selecting of the set comprises:

determining, by the cache controller, that the compression ratio of the line has a second value indicating that the line is compressed; and selecting, by the cache controller, the index at the second index bit position of the address of the line, the second index bit position comprising one or more significant bits compared to the first index bit position.

14. A method for retrieving a line of data, comprising:

receiving, by a cache controller, an address for a lookup;

identifying, by the cache controller, a first candidate set of a cache memory having a first index at a first index bit position of the address;

identifying, by the cache controller, a second candidate set of the cache memory having a second index at a second index bit position of the address different from the first index bit position;

searching, by the cache controller, in the first candidate set for the line;

searching, by the cache controller, in the second candidate set for the line; and returning, by the cache controller, the line based on the searching.

15. The method of claim 14, wherein the second index bit position is shifted to one or more significant bits from the first index bit position.

16. The method of claim 14, wherein the first index bit position is the same as positions of index field bits of the address for the lookup, and the second index bit position is different from the index field bits of the address.

17. The method of claim 14, further comprising:

identifying, by the cache controller, a first candidate tag at a first tag bit position of the address based on the first index bit position of the address;

identifying, by the cache controller, a second candidate tag at a second tag bit position of the address based on the second index bit position of the address;

searching, by the cache controller, an entry in the first candidate set based on the first candidate tag; and searching, by the cache controller, an entry in the second candidate set based on the second candidate tag, wherein the first tag bit position is different from the second tag bit position.

18. The method of claim 17, wherein the searching of the entry in the first candidate set comprises:

comparing, by the cache controller, a tag of the entry with the first candidate tag;

identifying, by the cache controller, an expected compression ratio based on the first index bit position; and comparing, by the cache controller a compression ratio value of the entry with the expected compression ratio, wherein, in response to a match of each of the comparing for the entry in the first candidate set, the line associated with the entry from the first candidate set of the cache memory is returned, and wherein, in response to a miss resulting from the searching in each of the first candidate set and the second candidate set, the line is retrieved, by the cache controller, from another memory, and stored, by the cache controller, in a set of the cache memory according to a compression ratio of the line of data.

19. The method of claim 17, wherein the searching of the entry in the second candidate set comprises:

comparing, by the cache controller, a tag of the entry with the second candidate tag;

identifying, by the cache controller, an expected compression ratio based on the second index bit position;

comparing, by the cache controller, a compression ratio value of the entry with the expected compression ratio;

determining, by the cache controller, a state of one or more valid bits of the entry; and comparing, by the cache controller, the state with a valid state, wherein, in response to a match of each of the comparing for the entry in the second candidate set, the line associated with the entry from the second candidate set of the cache memory is returned, and wherein, in response to a miss resulting from the searching in each of the first candidate set and the second candidate set, the line is retrieved, by the cache controller, from another memory, and stored, by the cache controller, in a set of the cache memory according to a compression ratio of the line of data.

* * * * *